May 26, 1970   E. R. BROOKER   3,514,127
SWIVEL COUPLINGS

Filed Sept. 28, 1967   2 Sheets-Sheet 1

INVENTOR

BY

ATTORNEY

United States Patent Office 3,514,127
Patented May 26, 1970

3,514,127
SWIVEL COUPLINGS
Edward Richard Brooker, Ampthill, England, assignor to The United Flexible Metallic Tubing Company Limited, Enfield, Middlesex, England, a British company
Filed Sept. 28, 1967, Ser. No. 671,420
Int. Cl. F16l 53/00
U.S. Cl. 285—41                                  2 Claims

ABSTRACT OF THE DISCLOSURE

A swivel coupling for joining in a gas- or liquid-tight manner a rotating or oscillating component and a stationary component. A seal member is urged into contact with the end of the stationary component by a bellows fixed to the other component. The two components are supported for relative rotation by bearings disposed around the bellows and are spaced therefrom to accommodate fan blades which circulate cooling air. The seal member is apertured to permit controlled escape of fluid passing through the coupling when a predetermined degree of seal wear has occurred. The escape of fluid is used to actuate a warning device.

---

This invention relates to a swivel couplings, that is to say, couplings for providing a connection in gas- or liquid-tight manner between a rotating or oscillating component and a stationary component. Most swivel couplings operate satisfactorily at comparatively low pressures and at comparatively low temperatures but design problems arise in the case of swivel couplings intended for use at higher pressures and temperatures. One particular difficulty is that of maintaining adequate lubrication of bearing provided to permit rotation of and to resist axial loading of the coupling in use.

It is an object of the present invention to provide a swivel coupling able to operate more satisfactorily than existing couplings at comparatively high pressures and temperatures and yet it is of a generally economic construction.

SUMMARY OF THE INVENTION

According to the present invention a swivel coupling comprises an output member, an input member axially aligned with the output member and axially spaced therefrom, a bellows unit secured at one end in gas-tight manner to one of the members and extending axially from that member towards the other member, an annular seal member held between the other end of the bellows unit and an adjacent surface of the other member, a bearing support member around the bellows unit and co-axial with the input and output members, the supporting member being operatively connected to one of the members, and a housing rotatably mounted upon the support member by means of bearings, the housing being connected to the other member.

Preferably, there is an annular space between the bellows unit and the bearing support member in which are located fan blades for circulating air through the space to encourage additional cooling of the bearings by forced air flow.

The bearings may be taper, roller or ball bearings which both support the housing and receive axial thrust. Alternatively, plain, ball or roller bearings may be used to support the housing and separate bearings employed to receive axial thrust. The choice of bearings depends primarily on the speed of rotation or oscillation but is also affected by the temperature of the fluid to be passed through the coupling.

The bearings are packed with temperature-resistant lubricant, leakage of which is reduced or prevented by piston-ring type seals which also reduce or prevent ingress of moisture.

The bellows unit may comprise a metallic bellows secured in gas-tight fashion between a mounting means on the one member and a rotatable seal support. The annular seal which may be of non-metallic material, for example, carbon is positioned between the seal support and the adjacent surface on one of the members. The annular seal can be strengthened by means of a peripheral ring of metal. A collar may be mounted upon the seal support to restrict movement of the annular seal.

The invention also provides a non-metallic annular seal having at least one passage or a groove extending from the inner curved face of the annulus towards but terminating short of the outer curved face of the annulus. The position of the passage, passages or groove along the axis of the annulus will depend upon features which will be explained later. Where there are several passages, these will occupy the same position on the axis, but will, of course, be spaced circumferentially round the inner face of the annulus. The several passages will be of the same length.

The seal just described is for use in a swivel coupling having a passageway providing access to the seal via that end of the one member in contact with the seal. The passage is so arranged that it will be placed in communication with the groove, periodically with the passageway, or in turn with each of the passageways when a predetermined amount of seal wear has taken place.

Preferably, the coupling is fitted with or to a visual or audible warning device operated by leakage of fluid from the coupling via the passage, passages or groove in the seal and the passageway just mentioned.

A non-return valve may be fitted in the passageway just mentioned, and arranged normally to close the passageway and to open it only when connected to warning device.

DESCRIPTION OF THE PREFERRED EMBODIMENT

Figure 1:
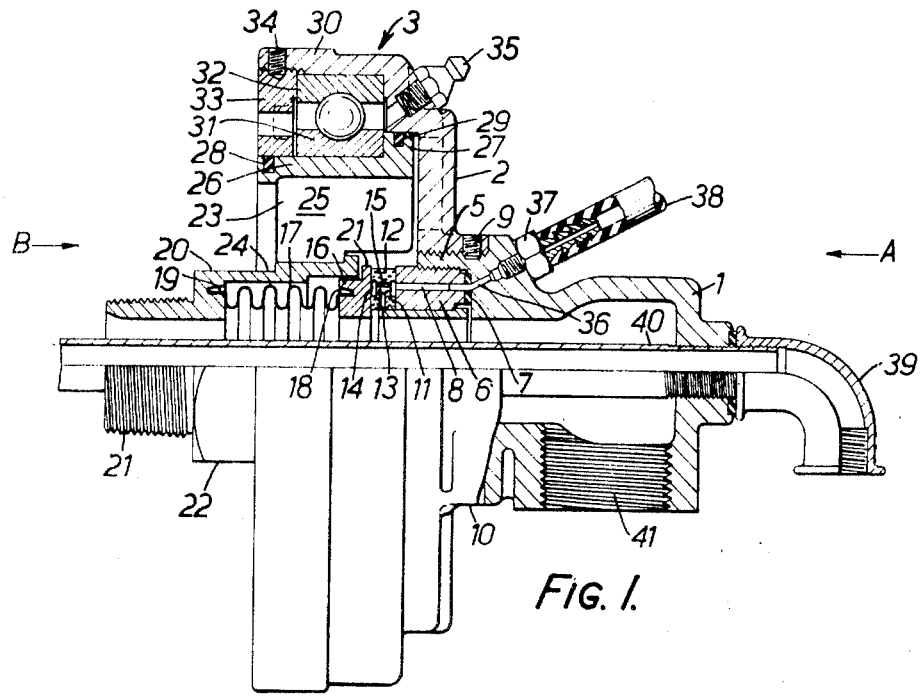
FIG. 1 is a side elevation partly in section of the embodiment.
Figure 2:
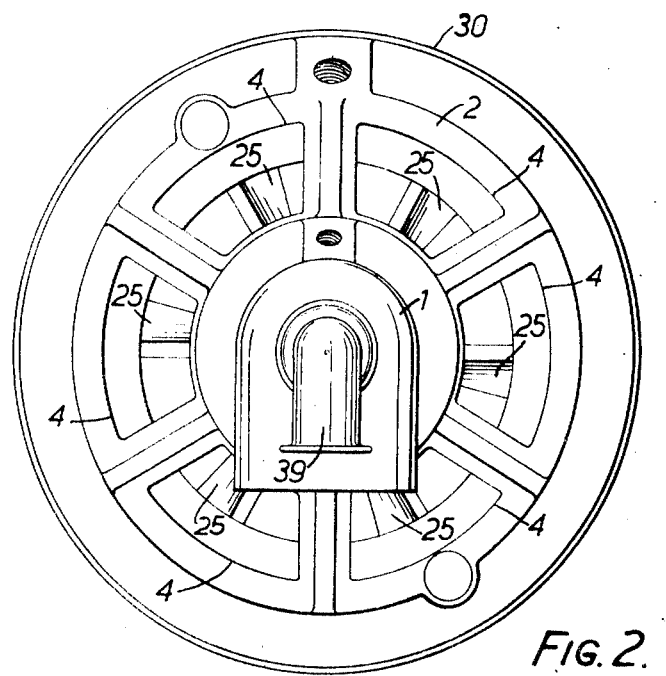
FIGS. 2 and 3 are views looking in the direction of arrows A and B respectively, certain components having been removed.
Figure 3:
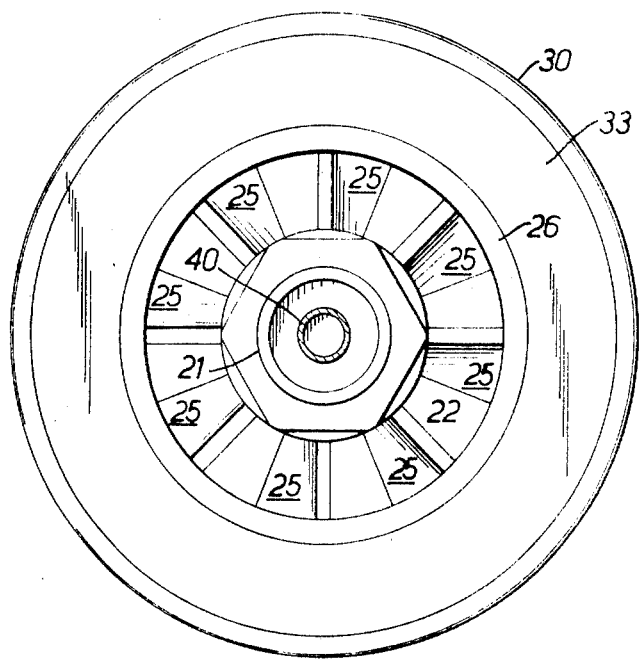

An input member 1 passes through the end face 2 of a cylindrical housing 3. The end face has several apertures 4 in it spaced round the member 1. The member 1 has a central flange 5 which is threaded internally to receive a static seal support 6, the end of support 6 and the base of the flange 5 being sealed together by a gasket seal 7 to prevent leakage. The support 6 also has a passageway 8 whose function will be described later. The flange 5 is located in a central aperture in the end face 2, the member 1 and housing 3 being screwed together and locked by screws 9 which pass through a flange 10 surrounding the central aperture and into the member 1.

The exposed end 11 of support 6 is ground and lapped flat and forms a bearing face for co-operation with one face of a carbon seal ring 12 of generally annular form. The ring may have an external, closely-fitting reinforcing ring but this is not essential. The seal ring 12 has a radially extending groove 13 in its inner curved wall and circumferential grooves 14 in its two flat faces. The grooves 14 are interconnected by a bore 15 which clears the outer wall of the groove 13 as shown in FIG. 1.

The seal 12 is held between the face 11 of the support 6 and that of a rotating seal support 16 carried by a flexible metallic bellows 17. The support 16 has a mounting groove 18 in which is fixed one end of the bellows 17, the other end of the later being secured in a similar groove 19 in an output member 20. The seal support 16 also has an outwardly directed flange-like extension 21 thereby providing a bearing face of adequate dimension in the radial direction and a surface which co-operates with the adjacent end of member 20 to limit movement of the support 16 towards the member 20.

The output member 20 is of generally tubular form and is axially aligned with the input member 1. As can be seen from FIG. 1, the bellows 17 and part of the seal support 16 are located within a part of member 20 where the bore is greater than that of the remainder of the member. The member 20 is externally screw-threaded as at 21 for connection purposes as will be explained later, and has a hexagonal surface 22 for receiving a spanner.

Surrounding the output member 20 is an annular component 23 having a stepped inner surface 24 which co-operates with a similarly stepped surface on the outside of the member 20. Component 23 has a multiplicity of fan blades of which one, 25, is visible in FIG. 1. The blades terminate in an outer part 26 of component 23 and which is flanged at one end as at 27 and having circumferential grooves 28, 29 in which piston ring seals are housed. The blades are of a helical configuration and their free inner ends support the member 20.

As can be seen from FIG. 1, the housing 3 is of cup-shaped form and receives the majority of the components just described. Located between the cylinder 26 and the curved wall 30 of the housing 3 is a ball-bearing assembly whose inner race 31 is in contact with the outer surface of the cylinder 26 and whose outer race 32 is in contact with the inner surface of the curved wall 30. The ball bearing assembly and thus the component 23 and the output member 20 are held in the positions shown in FIG. 1 by a retaining ring 33 screwed into the housing 1 and locked in position by a grub screw 34.

The housing 3 has a lubrication nipple 35 to enable lubricant to be fed to the bearing assembly when required.

In communication with the passageway 8 is a bore 36 in the member 1 which communicates in turn with a connector 37 screwed into the enlarged end portion of the bore 36. Coupled to the connector 37 is a flexible tube 38 leading to an indicator or warning device (not shown).

The coupling shown in the drawings is intended to form part of a steam supply and condensate removal for a steam-heated roller. Accordingly, the coupling has an elbow 39 fitted to the input member 1 which communicates with a condensate removal pipe 40 which extends co-axially through the coupling and into the roller (not shown). The input member has a steam inlet aperture 41 which, in use, is joined to a steam supply pipe (not shown).

The coupling itself is screwed to an end face of the roller by means of the screw thread 21 on the output member 20.

In use, steam enters via aperture 41 and passes through the coupling into the roller and condensate leaves the latter via pipe 40 and elbow 39.

Output member 20, component 23 and inner race 31 rotate with the roller as do the bellows 17 and the seal support 16. The remaining parts of the coupling are stationary. The steam path through the coupling is sealed as between the fixed and moving parts by the seal 12. Sealing pressure is obtained from the bellows 17 which is under some compression when the parts of the coupling are assembled.

When the coupling is used with working fluid pressures which are comparatively high, it may be necessary to supplement the sealing pressure provided by the bellows 17. That can be done, for example, by a helical spring disposed externally of the bellows 17 between the latter and the member 20 and acting between the latter and the seal support 16. Such a construction my require the member to be of two- or more part construction.

As the component 23 rotates during use, the fan blades 25 circulate air through the coupling and this cools the latter and the bearing assembly so that adequate lubrication of the latter is more easily maintained.

Wear of the seal 12 is taken up by the bellows 17 and the helical spring (if provided). As wear of the seal 12 continues, a point is reached when the groove 13 is exposed and steam can then pass through the groove, one or both of the grooves 14 into bore 36 and operate the indicator or warning device referred to above thereby giving warning that the seal will soon need to be replaced.

Lubrication of the bearing assembly is normally effected manually but alternatively automatic lubrication may be provided and can be used to lubricate a number of couplings.

I claim:

1. A swivel coupling having a fluid passageway therethrough comprising an output member, an input member axially aligned with the output member and separated therefrom by an axial space, a bellows unit secured at one end in fluid-tight manner to one of the members and extending across said axial space from the one member towards the other member, an annular seal member, a seal support member secured to the end of the other member, the seal member sealingly held between the other end of the bellows unit and the seal support member, at least one passageway in the seal having communication with said fluid passageway and extending from the inner curved surface of said seal towards but terminating short of the outer curved surface thereof, a passageway in the seal support member communicating with the passageway in the seal member on predetermined wear of the latter, a bearing support member around the bellows unit and coaxial with the input and output members, the bearing support member being operatively connected to one of the input and output members, a housing mounted upon the other of said members and rotatably mounted upon the support member by means of bearings, and, a passageway extending through the housing and communicating with the passageway in the seal support member.

2. A swivel coupling comprising an output member, an input member axially aligned with the output member and separated therefrom by an axial space, a bellows unit secured at one end in fluid-tight manner to one of the input and output members and extending across said axial space to the other member, an annular seal member sealingly held between the other end of the bellows unit and an adjacent surface on the other member, a bearing support member around the bellows unit and spaced therefrom by an annular space, the support member being operatively connected to one of the members, a housing rotatably mounted upon the support member by means of bearings, the housing being connected to the other member, and, in said annular space a plurality of rotatable fan blades extending from the bearing support member, said blades being fixed to said bearing support member against movement thereto, and supporting one of the input and output members.

References Cited

UNITED STATES PATENTS

| | | | |
|---|---|---|---|
| 1,567,813 | 12/1925 | Oleson | 285—106 |
| 2,238,654 | 4/1941 | Maier | 285—96 X |
| 2,399,823 | 5/1946 | Phillips | 285—276 X |
| 2,494,887 | 1/1950 | Lenhart | 277—22 |
| 2,676,039 | 4/1954 | Habig | 285—94 |
| 2,793,058 | 5/1957 | Jacobson | 285—41 X |
| 3,183,022 | 5/1965 | Sayag | 285—93 |

FOREIGN PATENTS 858,507  1/1961  Great Britain.

DAVID J. WILLIAMOWSKY, Primary Examiner

D. W. AROLA, Assistant Examiner

U.S. Cl. X.R.

277—2, 22; 285—93, 98, 276